United States Patent [19]
Ito et al.

[11] Patent Number: 5,310,332
[45] Date of Patent: May 10, 1994

[54] INJECTION MOLDING MACHINE WITH A MOVABLE DISPLAY DEVICE

[75] Inventors: Susumu Ito; Kikuo Watanabe; Koichi Nishimura, all of Oshino, Japan

[73] Assignee: Fanuc Ltd., Yamanashi, Japan

[21] Appl. No.: 856,912

[22] PCT Filed: Oct. 31, 1990

[86] PCT No.: PCT/JP91/01216
§ 371 Date: May 18, 1992
§ 102(e) Date: May 18, 1992

[87] PCT Pub. No.: WO92/05025
PCT Pub. Date: Apr. 2, 1992

[30] Foreign Application Priority Data

Sep. 20, 1990 [JP] Japan ................. 2-248812

[51] Int. Cl.$^5$ ............................ B29C 45/76
[52] U.S. Cl. ........................ 425/169; 425/574
[58] Field of Search ................... 425/169, 574

[56] References Cited
U.S. PATENT DOCUMENTS 3,587,391  6/1971  Pitts et al. ............... 409/235
4,773,842  9/1988  Aoki ....................... 425/574

FOREIGN PATENT DOCUMENTS 8902339  3/1989  European Pat. Off. .
2561163  9/1985  France .
61-87914  6/1986  Japan .
63-107534  5/1988  Japan .
1-285317  11/1989  Japan .

*Primary Examiner*—Tim Heitbrink
*Attorney, Agent, or Firm*—Staas & Halsey

[57] ABSTRACT

An injection molding machine furnished with a movable display device, which will not become a hindrance to operations to be performed around the injection molding machine, requires no holding space in the injection molding machine and provides a high operating performance. A pole is set up on the side of a mold clamping unit with respect to a swivel shaft of an injection unit at the back of an injection unit, and a rocking arm, which is supported for horizontal rotation by the upper end portion of the pole, is situated close to the top face of the injection unit and bent at the middle portion thereof. The display device, which is mounted on the end portion of the swing arm on the opposite side to the pole, is movable between a retreating position over the injection unit and a working position above but away frontward from the front face of the injection unit. The display device is supported on the injection unit through a ball caster which is attached to the lower surface of the middle portion of the swing arm.

2 Claims, 2 Drawing Sheets

INJECTION MOLDING MACHINE WITH A MOVABLE DISPLAY DEVICE

BACKGROUND OF THE INVENTION

1. Field of the Invention

The present invention relates to an injection molding machine with a movable display device, and more particularly, to a movable display device with a high operating performance.

2. Description of the Related Art

In an injection molding machine, especially in an electrically-operated injection molding machine furnished with a numerical control device, a display device with a manual data input device is used to set various molding conditions, monitor the operating state, and warn of an abnormal operating state, for example. Thus, the display device plays an important role in the injection molding machine.

Conventional display devices provided for the injection molding machine are divided broadly into three types: stand-type display devices fixed on a stand fixed on the floor, built-in display devices contained in the injection molding machine, and pendant-type display devices suspended from a swing arm.

Some of the stand-type display devices, being fixedly arranged near the injection molding machine, sometimes become hindrances to an operator in carrying out various operations. The built-in display devices, especially large-sized CRT display devices, are so bulky and heavy in weight that they require a wide holding space, and their attachment to and detachment from the injection molding machine require some labor. Although the pendant-type display devices (see Published Unexamined Japanese Patent Application JP,A, 63-107534, for example) are advantageous in being movable between a retreating position and a working position, the length of the swing arm for suspending the display device has to be limited due to its mechanical strength. This also limits the movable range of the display device, thereby causing some problem in operating efficiency such that the display device cannot be brought to an optimum position for use. Besides, the swing arm for suspending the display device needs to be installed at a considerably high position, so that a pole for supporting the swing arm is required to be long. This requires the rigidity of the pole to be increased, which leads to high cost.

SUMMARY OF THE INVENTION

The objects of the present invention are to provide an injection molding machine furnished with a movable display device, which will not become a hindrance to the operations to be performed around the injection molding machine, requires no holding space in the injection molding machine, and provides high operating performance.

In order to achieve the above objects, an injection molding machine according to the present invention comprises a pole set up at the back of an injection unit, a swing arm supported for horizontal rotation by the pole and situated close to the top face of the injection unit, and a display device mounted on the end portion of the swing arm on the opposite side to the pole, so that the display device is movable between a retreating position over the injection unit and another working position, which is accessible for the display device from the position over the injection unit where the display device rests parallel to the front face of the injection unit.

Preferably, the swing arm is bent toward the display device working position at the middle portion thereof. Further, the pole is situated on the side of a mold clamping unit with respect to a swivel shaft of the injection unit on a base of the injection molding machine. Furthermore, the swing arm has, on the lower surface of the middle portion thereof, a ball caster rollable on the top face of the injection unit, and is supported on the injection unit through the ball caster.

As described above, the injection molding machine of the present invention is mounted on one end of the swing arm, which is swingably supported by the pole set up at the back of the injection unit situated on the opposite side to the pole, and so that the display device can be swung between the retreating position over the injection unit and the working position, which is accessible for the display device from the position along the front face of the injection unit. Thus, the display device not only can be prevented from hindering but also, unlike the display devices of the built-in type, does not require a display device holding space in the injection molding machine. Besides, the swing arm is situated close to the top face of the injection unit, so that the length of the pole can be reduced. This enables the increase in the rigidity of the pole and the resulting increase in the length of the swinging arm. Thus, the ranges of movement of the swing arm and the display device mounted thereon can be increased to improve the operating performance of the display device. This also enables the reduction of pole cost.

Preferably, the rocking arm is bent toward the display device working position at the middle portion thereof to permit the ranges of movement of the swing arm and the display device to be further increased, thereby contributing to the further improvement in the operating performance of the display device. Since the pole is situated on the side of the mold clamping unit with respect to the swivel shaft of the injection unit on the base of the injection molding machine, the pole will not impede the horizontal rotation of the injection unit with respect to the swivel shaft. More preferably, the swing arm is supported on the injection unit through the ball caster, which is provided on the lower surface of the swing arm on the display-device side to be rollable on the top face of the injection unit, so that the swing arm can be further lengthened, and therefore, the operating performance, as well as the range of movement, of the display device can be further improved.

DETAILED DESCRIPTION OF THE PREFERRED EMBODIMENTS

Figure 1:
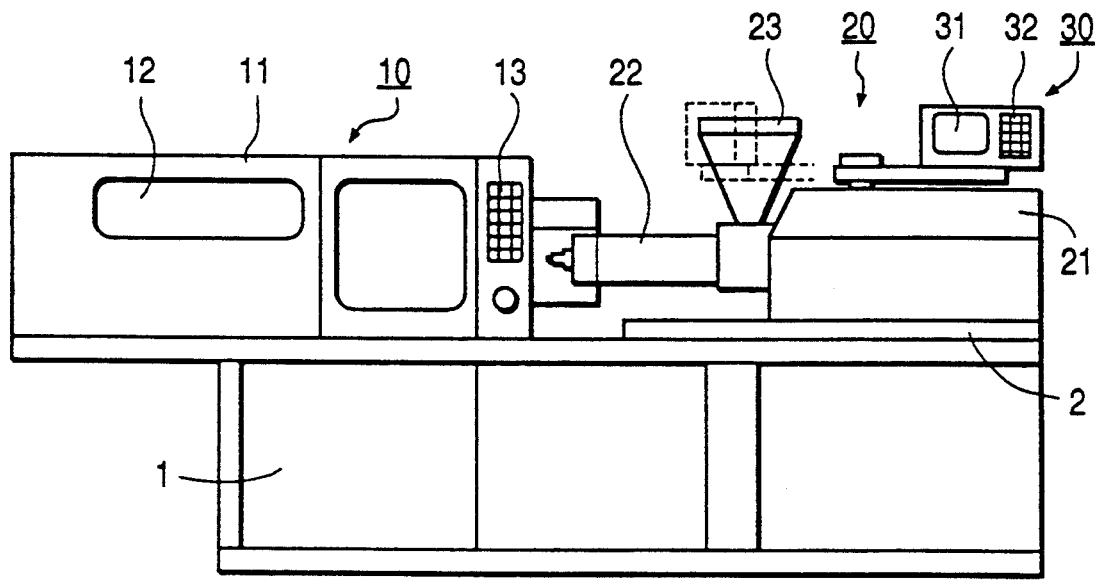
FIG. 1 is a schematic front view showing an electrically-operated injection molding machine according to one embodiment of the present invention.

Referring now to FIGS. 1 through 4, an electrically-operated injection molding machine according to one embodiment of the present invention will be described.

The injection molding machine comprises a mold clamping unit 10 fixed on a base 1, and the mold clamping unit 10 includes a protective cover 11 covering the whole body of a mold clamping mechanism (not shown). A transparent window 12 for observing the operation of a mold mounting section of the mold clamping mechanism is provided on the front face of the left-hand half portion of the protective cover 11, while a control panel 13 for the control of operations associated with start, stop, emergency stop, manual operation, semiautomatic operation, automatic operation, etc. is provided on the front face of the right-hand half portion of the protective cover 11.

Further, the injection molding machine comprises an injection unit 20 disposed on an extruder base 2 on the base 1. The injection unit 20 comprises a flat-topped protective cover 21 covering an injection mechanism (not shown), which includes front, movable, and rear plates, a cylinder assembly 22 including a screw (not shown), and a hopper 23 located over the proximal end portion of the cylinder assembly 22. The injection unit 20, together with the extruder base 2, can move toward or away from the mold clamping unit 10 to establish or cancel the nozzle touch state. For screw replacement or the like, the injection unit 20 is made to be horizontally rotatable round a swivel shaft 3, shown in FIG. 2, located on the extruder base 2.

Figure 2:
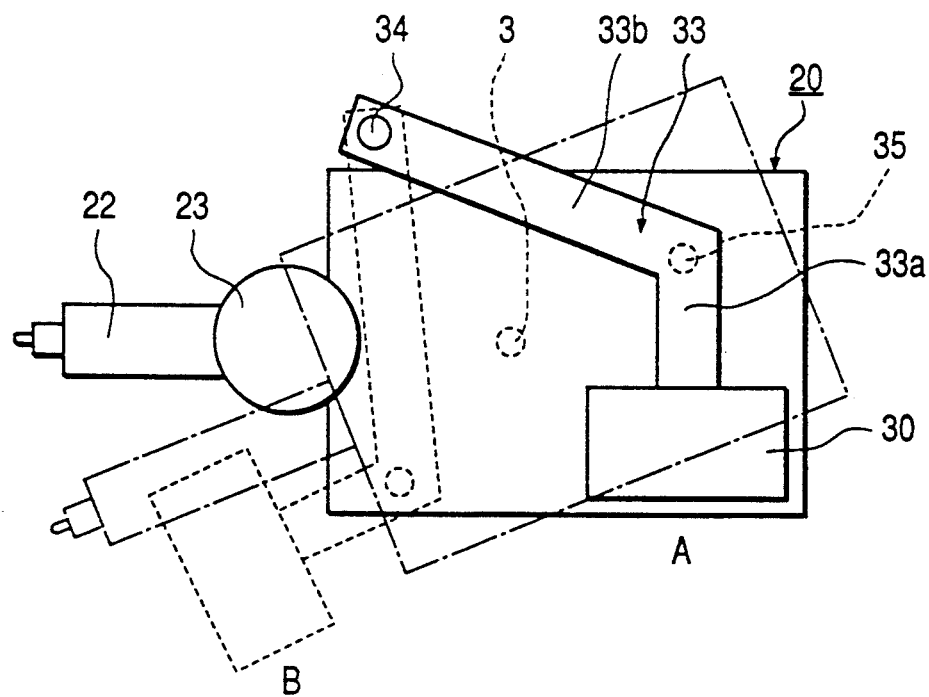
FIG. 2 is a partial schematic plan view illustrating the movement of a display device between a retreating position and a working position and horizontal rotation of an injection unit round a swivel shaft.

The injection molding machine further comprises a movable display device 30 which includes a CRT screen 31 and a manual data input device 32. Control information delivered from a numerical control device (not shown) can be displayed on the CRT screen 31, and an operator can manually input various data through the manual data input device 32. As shown in FIG. 2, the movable display device 30 is mounted on the top face of the distal end portion of a swing arm 33, which is supported for horizontal rotation by means of a pole 34 set up on the base 1, and is movable between the retreating position A over the injection unit 20 and the working position B situated outwardly away from the front face of the injection unit 20.

Figure 3:
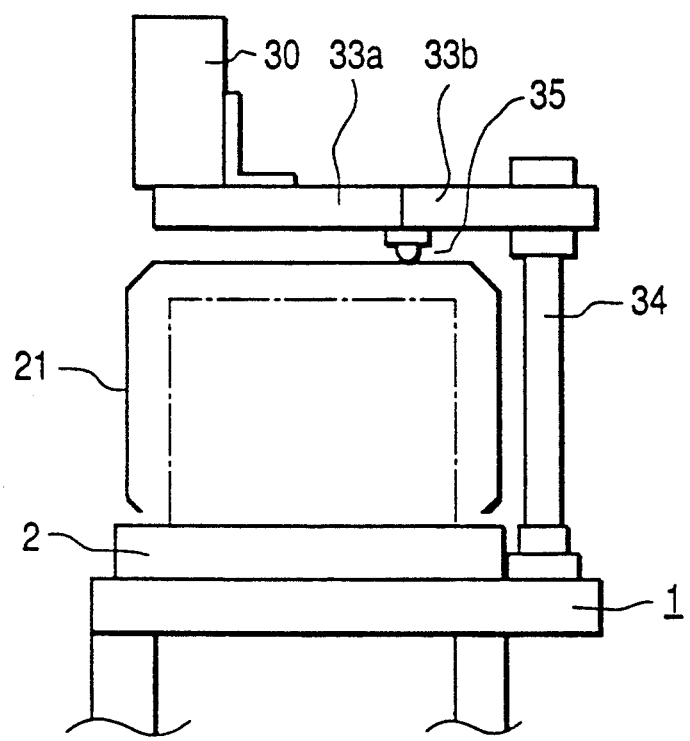
FIG. 3 is a partial schematic right-hand side view of the injection molding machine.

More specifically, as shown in FIGS. 2 and 3, the pole 34 vertically extends along the back of the injection unit 20, and its lower end is fixed to the edge portion of the base 1 in between the swivel shaft 3 and the hopper 23 on the rear side on the injection unit. The swing arm 33, which is rotatably supported of the upper end portion of the pole 34, is located close to the top face of the injection unit 20, as shown in FIGS. 2 and 3, and is bent toward the working position of the display device or bent backward at the middle portion thereof, as shown in FIG. 2.

More specifically, the swing arm 33 is composed of the first arm section 33a on the display device side and the second arm section 33b formed integrally therewith and extending aslant by from the first arm section 33a toward the pole 34. The second arm section 33b has the minimum necessary length enough for the display device 30 and the swing arm 33 to avoid interfering with the hopper 23 in bringing the display device 30 to the working position B. The length of the first arm section 33a and the bending angle of the swing arm 33 are determined so that the display screen 31 can be set parallel to the front face of the injection unit 20 without projecting outward from the front face of the injection unit when the display device 30 is brought to retreating position A.

Figure 4:
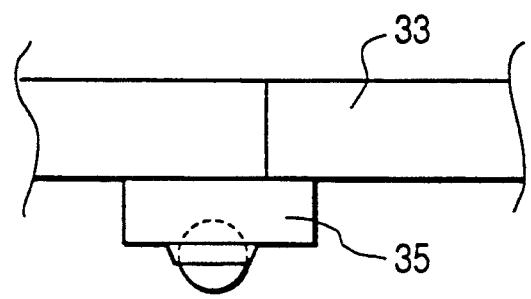
FIG. 4 is a partial enlarged side view showing a swinging arm.

As shown in FIGS. 3 and 4, a ball caster 35, which is horizontally rotatable with respect to the arm 33 and rollable on the top face of the injection unit 20, is attached to the lower surface of the middle portion of the swing arm 33. The swing arm 33 and the display device 30 are supported vertically through the ball caster 35 on the injection unit 20. The ball caster 35 is attached to a position e.g. a bent portion of the arm 33, whereby the arm 33 can be prevented from getting out of the area of top-face of the injection unit when it swings between the retreating position A and the working position B.

The swing arm 33 is hollow, and a wire cable (not shown) for connecting the display device 30 to the numerical control device and the like is contained in the arm 33 without being covered with a protective reinforcement tube such as a conduit.

The following is a description of the operations of the display device and its peripheral elements arranged in the above-described manner.

While the injection molding machine is running, the display device 30 is located in the retreating position A, as indicated by a full line in FIG. 2. In this case, the display device 30 is situated inside the front face of the injection unit 20, so that it will not be an obstacle to the operator's various operations around the injection molding machine. Since the display device 30 is supported on the injection unit 20 through the arm 33 and the ball caster 35, the position and altitude of the display device 30 are stable. Besides, the pole 34, being located behind the injection unit 20, will not become a hindrance to the operator's operations. The operator monitors the operating state of the injection molding machine with reference to operating information displayed on the CRT screen 31. When the display device 30 is in the retreating position A, the CRT screen 31 faces front for easy monitoring of the operating state.

When necessary, the operator can bring the display device 30 to the working position B, which is indicated by a broken line in FIG. 2. In doing so, for example, the operator pushes the right-hand side of the display device 30 to make the swing arm 33 rotate horizontally around the pole 34 until the second arm section 33b of the arm 33 comes to abut against the peripheral surface of the hopper 23. As a result, the display device 30 is located in a position on the side of the mold clamping unit 10 with respect to the hopper 23 or the position where it projects toward the operator from the front face of the injection unit 20. Thus, the CRT screen 31 is not only situated near the operator standing in front of the control panel 13 but also faces the direction for ease of the operator's view. Since the pole 34 is situated at the back of the injection unit 20, it will not hinder the operator in moving the display device 30.

The operator performs, for example, mold thickness adjustment operation after mold replacement, with the display device 30 located in the working position B. In this case, relevant information such as the rear platen moving speed displayed on the CRT screen 31 can be confirmed satisfactorily, so that the operator can efficiently perform the operation by manipulating manual buttons, a die height button, a rear platen advance/retreat button, etc. on the control panel 13. If an emergency stop message or alarm message is displayed on the CRT screen, the operator can quickly cope with this, thereby ensuring safe operation.

In some cases, the injection unit 20 may be linearly moved toward or away from the mold clamping unit 10 in order to establish or cancel the nozzle touch state, or the injection unit 20 may be horizontally rotated around the swivel shaft 3, for screw replacement or the like as indicated by dashed line in FIG. 2. In these cases, the injection unit 20 moves smoothly with respect to the display device 30 as the ball caster 35 disposed between the unit and the display device 30 rolls.

Even while the injection unit 20 is linearly moving or horizontally rotating, the display device 30 is supported on the pole 34 by means of the swing arm 33, and it is also supported on the injection unit 20 through the ball caster 35. Thus, during the linear movement or horizontal rotation of the injection unit 20, the display device 30 will never become unstable, which assures safe performance. Since the pole 34 is situated on the side of the mold clamping unit 10 with respect to the swivel shaft 3 at the back of the injection unit 20, it neither impedes the horizontal rotation and linear movement of the injection unit 20 nor hinders the operator.

The present invention is not limited to the embodiment described above, and various modifications may be effected therein.

The ball caster 35 is provided on the lower surface of the swing arm 33 according to the above embodiment. However, in an embodiment not including the ball caster 35, the rigidity of the swing arm 33 and the pole 34 must be increased.

According to the above embodiment, the display device 30 is prevented from getting out of the working position B by means of the hopper 23. Alternatively, however, a stopper may be provided for preventing the deviation. Also, a stopper for preventing the display device 30 from deviating from the retreating position A may be provided.

Furthermore, the lengths of the first and second arm sections 33a and 33b of the swing arm 33 and the bending angle of the swing arm 33 may variedly be selected. More particularly, the position and direction of the CRT screen of the display device 30 in the retreating position A or the working position B may variedly be selected.

We claim:

1. An injection molding machine comprising:
   a pole located behind an injection unit;
   a swing arm supportably attached to said pole and being rotatable in a horizontal direction in close proximity above a top surface of said injection unit;
   a ball caster rollable on said top surface of said injection unit and attached to a lower surface of a middle portion of said swing arm; and
   a display device mounted on an end portion of said swing arm opposite to said pole and moveable between a retreating position directly above said injection unit and a working position above said injection unit at a position in front of a front surface of said injection unit.

2. The injection molding machine according to claim 1, wherein said swing arm is supported on said injection unit by said ball caster.

* * * * *